United States Patent
Hanna et al.

(10) Patent No.: US 10,176,373 B2
(45) Date of Patent: *Jan. 8, 2019

(54) COMPACT BIOMETRIC ACQUISITION SYSTEM AND METHOD

(71) Applicant: EyeLock LLC, New York, NY (US)

(72) Inventors: Keith J. Hanna, New York, NY (US); Hector T. Hoyos, New York, NY (US)

(73) Assignee: Eyelock LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,521

(22) Filed: Jul. 23, 2018

(65) Prior Publication Data

US 2018/0330161 A1  Nov. 15, 2018

Related U.S. Application Data

(63) Continuation of application No. 15/986,662, filed on May 22, 2018, which is a continuation of application (Continued)

(51) Int. Cl.
*G06K 9/00* (2006.01)
*G06K 9/20* (2006.01)

(Continued)

(52) U.S. Cl.
CPC ..... *G06K 9/00604* (2013.01); *G06K 9/00221* (2013.01); *G06K 9/00597* (2013.01);

(Continued)

(58) Field of Classification Search
CPC .. G06K 9/00; G06K 9/00087; G06K 9/00107; G06K 9/00114; G06K 9/0012;

(Continued)

(56) References Cited

U.S. PATENT DOCUMENTS 5,016,282 A * 5/1991 Tomono ............. G06K 9/00604
   382/117
6,082,858 A * 7/2000 Grace ................ G06K 9/00845
   257/440

(Continued)

FOREIGN PATENT DOCUMENTS

JP  2006031185 A  *  2/2006

*Primary Examiner* — Eric Rush
(74) *Attorney, Agent, or Firm* — Foley & Lardner LLP

(57) ABSTRACT

A method of determining the identity of a subject while the subject is walking or being transported in an essentially straight direction is disclosed, the two dimensional profile of the subject walking or being transported along forming a three dimensional swept volume, without requiring the subject to change direction to avoid any part of the system, comprising acquiring data related to one or more biometrics of the subject with the camera(s), processing the acquired biometrics data, and determining if the acquired biometric data match corresponding biometric data stored in the system, positioning camera(s) and strobed or scanned infrared illuminator(s) above, next to, or below the swept volume. A system for carrying out the method is also disclosed.

20 Claims, 25 Drawing Sheets

Related U.S. Application Data

No. 15/488,011, filed on Apr. 14, 2017, now Pat. No. 9,984,290, which is a continuation of application No. 13/797,258, filed on Mar. 12, 2013, now Pat. No. 9,626,562, which is a continuation of application No. 12/441,881, filed as application No. PCT/US2007/079160 on Sep. 21, 2007, now Pat. No. 8,965,063.

(60) Provisional application No. 60/826,560, filed on Sep. 22, 2006.

(51) Int. Cl.
*G07C 9/00* (2006.01)
*G06K 9/46* (2006.01)

(52) U.S. Cl.
CPC ..... *G06K 9/00617* (2013.01); *G06K 9/00892* (2013.01); *G06K 9/00899* (2013.01); *G06K 9/00906* (2013.01); *G06K 9/20* (2013.01); *G06K 9/2027* (2013.01); *G07C 9/00158* (2013.01); *G06K 2009/2045* (2013.01); *G06K 2009/4657* (2013.01)

(58) Field of Classification Search
CPC ........... G06K 9/00221; G06K 9/00255; G06K 9/00288; G06K 9/00597; G06K 9/00604; G06K 9/0061; G06K 9/00617; G06K 9/00885; G06K 9/00892; G06K 9/00899; G06K 9/00906; G06K 9/20; G06K 9/2027; G06K 2009/00644; G06K 2009/2045; G06K 2009/4657
USPC ........ 382/100, 103, 115, 117, 118, 312, 318, 382/321–325
See application file for complete search history.

(56) References Cited

U.S. PATENT DOCUMENTS

| | | | | |
|---|---|---|---|---|
| 6,542,624 | B1* | 4/2003 | Oda | G06K 9/00597 382/117 |
| 7,091,471 | B2* | 8/2006 | Wenstrand | G06K 9/00604 250/221 |
| 7,280,678 | B2* | 10/2007 | Haven | G06K 9/00604 382/117 |
| 7,417,727 | B2* | 8/2008 | Polonskiy | G06K 9/00255 382/115 |
| 7,809,171 | B2* | 10/2010 | Solinsky | G06K 9/00248 382/115 |
| 8,064,647 | B2* | 11/2011 | Bazakos | G06K 9/00261 382/117 |
| 2005/0084179 | A1* | 4/2005 | Hanna | G06K 9/00604 382/294 |
| 2005/0265585 | A1* | 12/2005 | Rowe | G06K 9/00046 382/124 |
| 2008/0002863 | A1* | 1/2008 | Northcott | G06K 9/00604 382/117 |

* cited by examiner

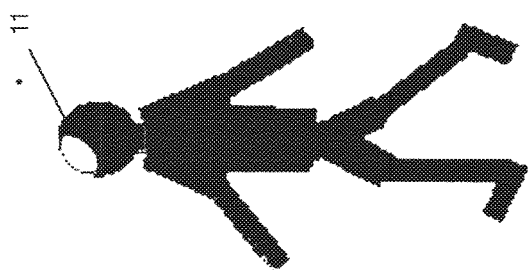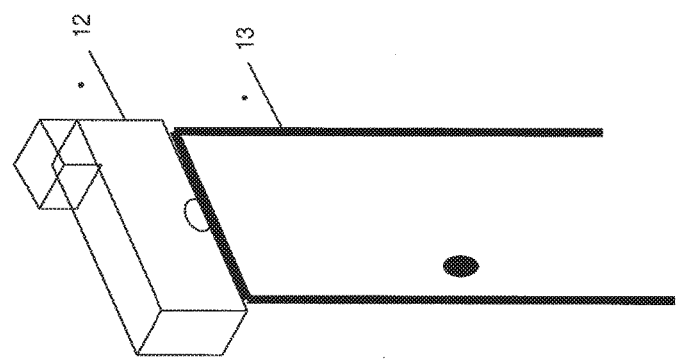
Fig. 1

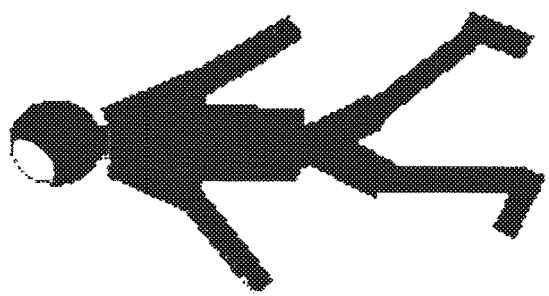
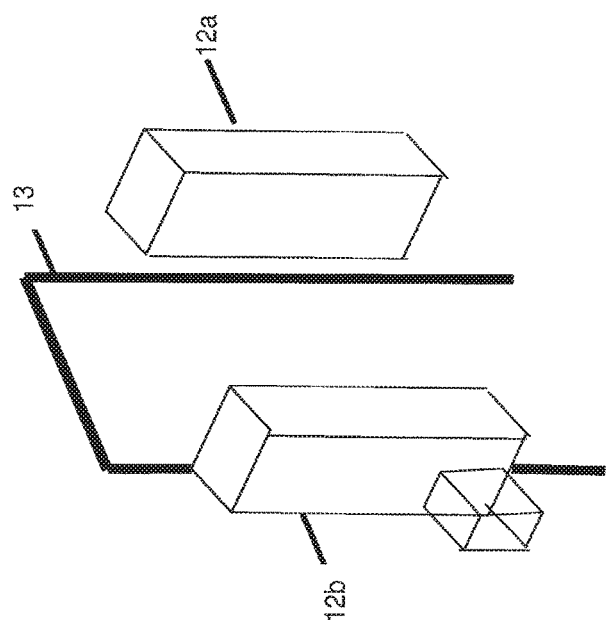
Fig. 4

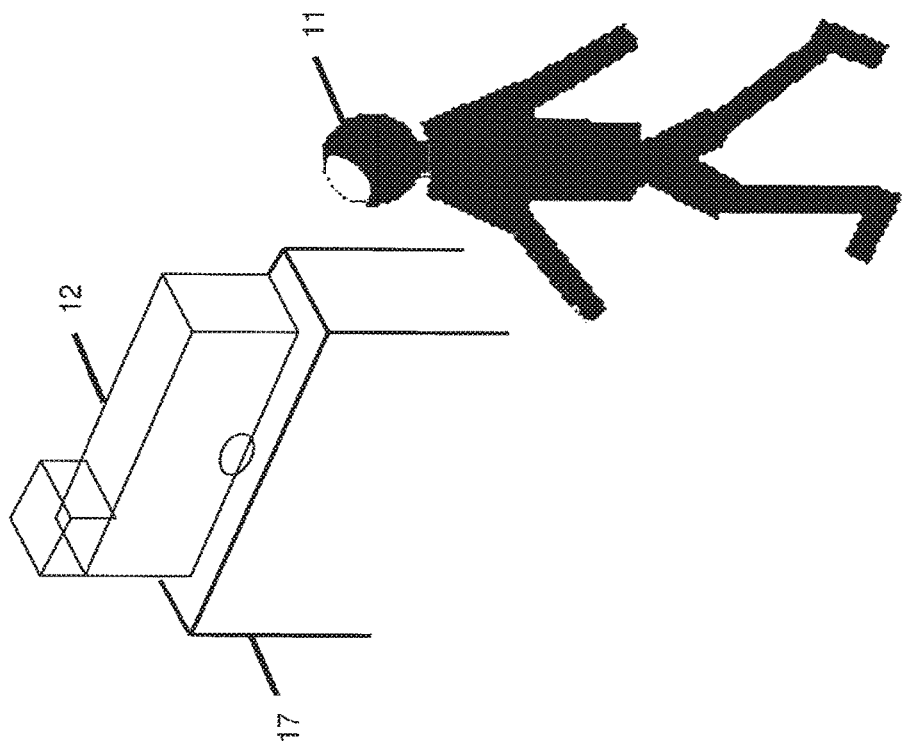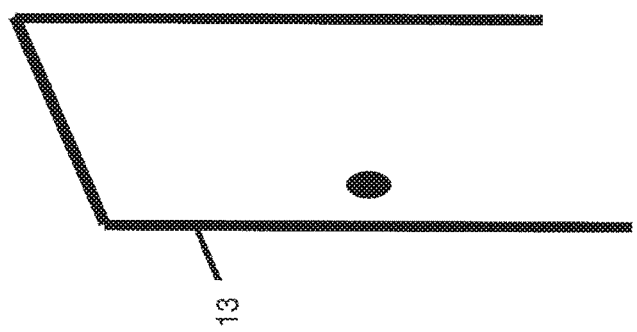
Fig. 5

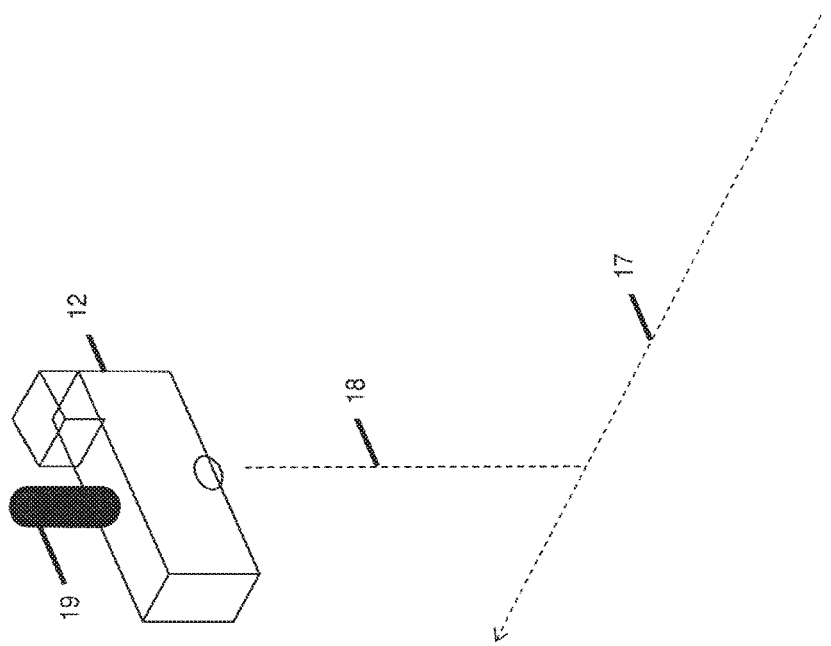
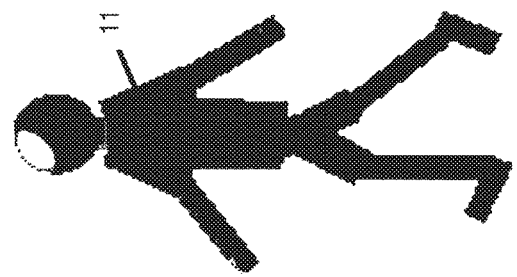
Fig. 6

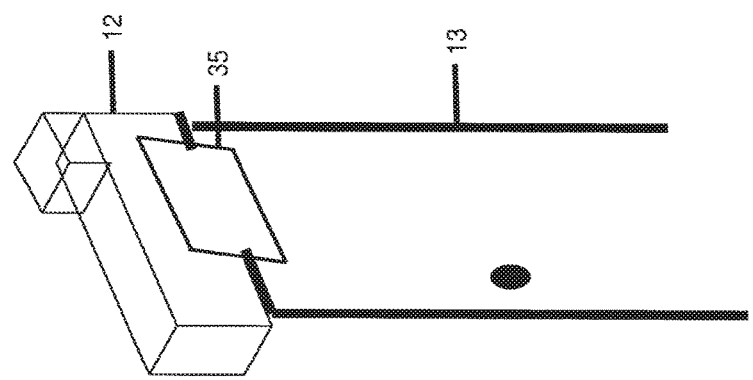
Fig.16
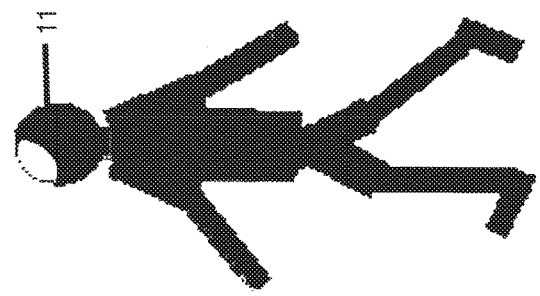

COMPACT BIOMETRIC ACQUISITION SYSTEM AND METHOD

RELATED APPLICATIONS

This application is a continuation of and claims priority to U.S. application Ser. No. 15/986,662 filed May 22, 2018, entitled "COMPACT BIOMETRIC ACQUISITION SYSTEM AND METHOD" which in turn is a continuation of and claims priority to U.S. application Ser. No. 15/488,011 filed Apr. 14, 2017, entitled "COMPACT BIOMETRIC ACQUISITION SYSTEM AND METHOD" issued as U.S. Pat. No. 9,984,290 on May 29, 2018, which in turn is a continuation of and claims priority to U.S. application Ser. No. 13/797,258, filed Mar. 12, 2013, entitled "COMPACT BIOMETRIC ACQUISITION SYSTEM AND METHOD" issued as U.S. Pat. No. 9,626,562 on Apr. 18, 2017, which is a continuation of and claims priority to U.S. application Ser. No. 12/441,881, filed Mar. 18, 2009 entitled "COMPACT BIOMETRIC ACQUISITION SYSTEM AND METHOD" issued as U.S. Pat. No. 8,965,063 on Feb. 24, 2015, which is a national stage entry of International application PCT/US2007/79160, filed Sep. 21, 2007, entitled "COMPACT BIOMETRIC ACQUISITION SYSTEM AND METHOD", which claims priority to U.S. provisional application 60/826,560 filed Sep. 22, 2006, entitled "COMPACT BIOMETRIC ACQUISITION SYSTEM AND ARCHITECTURE", all of which are hereby incorporated by reference for all purposes.

BACKGROUND OF THE DISCLOSURE

This invention relates to biometric acquisition, identification, fraud detection, and security systems and methods, more particularly biometric systems and methods which employ iris recognition, inter alia. Biometric acquisition systems generally employ cameras, lens, illumination, processors, and reporting functions. When such systems detect the identity of a subject, they can issue a signal, open a gate, sound an alarm, alert operators, or merely record the detection. Some biometric acquisition systems require a card swipe or other means of informing the system of the purported identity of a subject.

Previous systems were primarily kiosk-based, where the cameras and illumination were directly in front of the user, looking directly towards them.

More recently, "walk through" biometric identification systems have been disclosed. Walk through systems are designed to verify the identity of subjects who pass through an opening such as an airport gate, a door, or the like, by illuminating the subject as it passes through the gate, acquiring an image of one or two irises and/or facial features of the subject, applying an algorithm to an image to generate a set of data, and comparing the resultant set or sets of data to stored sets of data using pre-designated criteria and determining if there is a match between the sets of data and thereby determining if there is a match between the subject's iris and/or facial features and registered identities. In the prior art systems, the cameras were mounted in a device situated directly facing the user, such that the user had to walk around the cameras.

There are problems with existing systems which have prevented them from being widely adopted. The great disadvantage of the arrangement of illuminators and cameras is that the person has to stop or change their direction of motion, or else they will strike the cameras and illuminators. This approach has been the state-of-the-art in iris recognition for decades. Also, when the illumination in prior systems is continually turned on at normal levels, the illuminator must be replaced at frequent intervals. Also, the systems may be fooled into illuminating when non-subjects walk past them rather than subjects walking through them.

Some systems use multiple sensors to acquire data through spectral filters at the same time, which is inefficient.

Further, some systems are not capable of integrating non-biometric devices such as classic identification card systems which can be swiped or touched to a detector.

There has been a long-felt need in the field of biometric detection systems and methods for more efficient and effective detection, identification, and security.

SUMMARY

These needs and others as will become apparent from the following description and drawings, are achieved by the present invention which comprises in one aspect a system for determining the identity of a subject comprising a system for determining the identity of a subject while the subject is walking or being transported along in an essentially straight direction, the two dimensional profile of the subject walking or being transported along forming a three dimensional swept volume, without requiring the subject to change direction to avoid any part of the system, adapted to acquire one or more biometrics of the subject and determine if the acquired biometrics match corresponding biometric data stored in the system, the system comprising one or more cameras and one or more infrared illuminators which are strobed or scanned, wherein the cameras are positioned above, next to, or below the swept volume; and the illuminators are positioned above, next to, or below the swept volume.

In another aspect, the invention comprises a method of determining the identity of a subject while the subject is walking or being transported in an essentially straight direction, the two dimensional profile of the subject walking or being transported along forming a three dimensional swept volume, without requiring the subject to change direction to avoid any part of the system, comprising acquiring data related to one or more biometrics of the subject with the camera(s), processing the acquired biometrics data, and determining if the acquired biometric data match corresponding biometric data stored in the system, positioning camera(s) and strobed or scanned infrared illuminators above, next to, or below the swept volume.

The invention results in an order-of-magnitude increase in the throughput of people that can be processed by such a system. The substantial gain in throughput can be measured by time-and-motion analysis, and we have shown that the traditional systems where users faced cameras or lighting resulted in delays from having to find the kiosk or location to stop, wait for the prior person, putting down bags, reading instructions, waiting for the device to operate, picking up bags, finding the new direction in which to walk, and then walking to the new location. Even if each of these steps takes 2 seconds, then the cumulative time to perform biometric reading can take 10 seconds or more.

In one preferred configuration, the user looks at the camera as they walk, the lighting and cameras are not co-located since the user may be wearing glasses. In addition, the lighting and cameras should not be too far away from the user or else the signal/to/noise ratio of the image will be too low for acquisition of biometric imagery of sufficient quality for matching. Further, in embodiments of the invention where the user looks straightforward or at arbitrary points that are not necessarily the camera location, then the angle of the eye to the camera should not be too large or else image foreshortening will result in a smaller-than-required segment of the iris being captured. It is preferred that the lighting and cameras match the physical characteristics of doorways and other locations through which individuals walk through.

Another aspect of the invention is a system for determining the identity of a subject walking or being transported in an essentially straight direction comprising a motion sensor and an illuminator adapted to be turned on when motion is detected.

A still further aspect is placing the camera above, next to, or below a doorway or portal and acquiring the biometric data when the horizontal distance between the subject and at least one of the cameras is between 97.28 and 201.93 cm.

In applications wherein at least one camera is positioned on a counter and is used in a point of sale identity verification application and the horizontal distance between the camera and the area of biometric acquisition on the subject is preferably about 0.15 to 1.2 meters.

In another aspect of the invention is determining the identity of a subject comprising employing at least one camera and at least one illuminator adapted to illuminate at a level sufficient to detect the potential presence of biometric data and upon detection to illuminate at a high level sufficient to acquire biometric data with improved signal to noise.

BRIEF DESCRIPTION OF THE DRAWINGS

FIG. 1 illustrates a Subject walking towards camera and illumination unit mounted above a doorway or portal;

FIG. 4 illustrates Subject walking towards camera and/or illumination unit, and camera and/or illumination unit mounted on either side of a doorway or portal FIG. 5 illustrates Subject walking past camera and illumination unit mounted to one side of the person's swept-volume FIG. 6 illustrates a subject walking along path towards camera and illumination unit suspended from above by mount at a distance from the ground, such that the camera and illumination unit is free standing and has no contact with the ground.

FIG. 16 illustrates a video screen A showing one of video of the person, moving images, text, in order to attract attention as the user walks forward

DETAILED DESCRIPTION

While the invention is capable of many embodiments, for purposes of illustration a few embodiments are described below with reference to the drawings wherein FIG. 1 illustrates a subject 11 walking towards combined camera and stroboscopic illuminator housing 12 mounted above a doorway 13.

Figure 2:
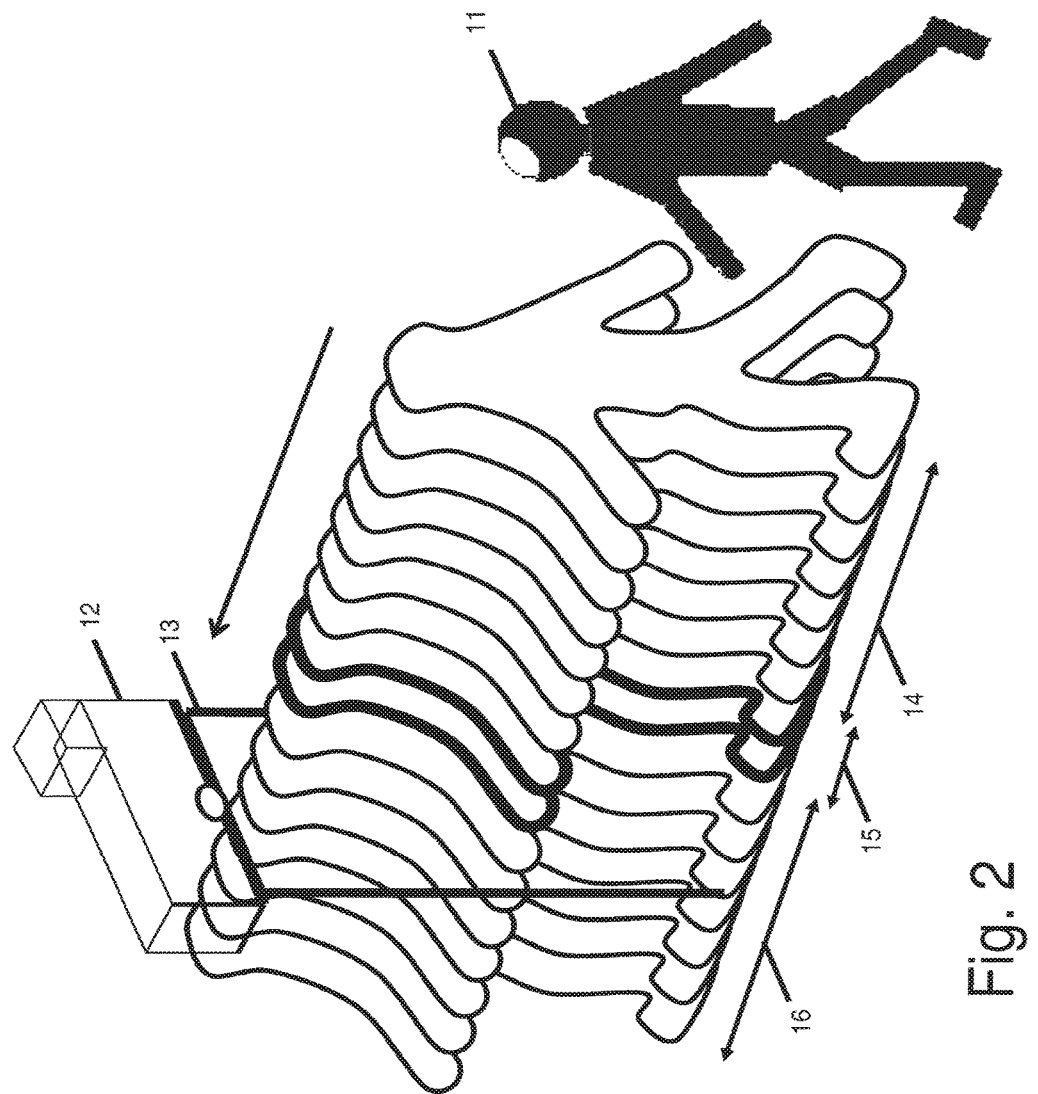
FIG. 2 illustrates swept volume of person.

FIG. 2 illustrates swept volume of subject 11 in three sections. The swept volume is a term referring to the three dimensional volume formed by a two dimensional section of a subject as it moves forward in a relatively straight line. In the case of FIG. 2, the subject 11 walks forward toward the doorway 13 and then through doorway 13. Imagery is acquired by the camera during periods when the stroboscopic infrared illuminator is flashed or the illuminator is scanned. The subject may alternatively be transported in the case of a moving floor or sidewalk or in the case of a wheelchair, cart, train, or other means of transporting the subject forward in a relatively straight line. The first section 14 of the swept volume is before image acquisition; the second section 15 of swept volume is during image acquisition; and the third section 16 is after image acquisition, including as the subject passes through the doorway 13.

Figure 3:
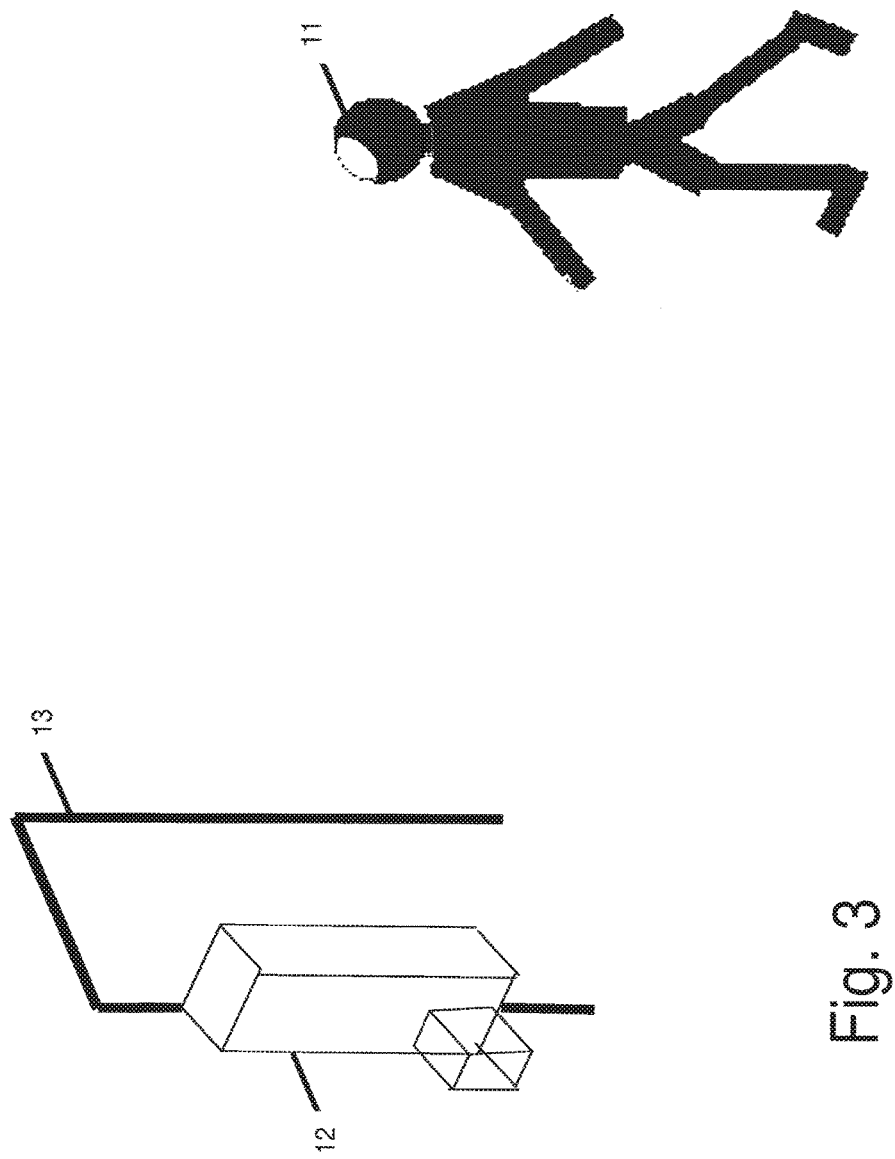
FIG. 3 illustrates Subject walking towards camera and illumination unit mounted to the side of a doorway or portal

FIG. 3 illustrates an alternative embodiment wherein the housing 12 is located on the side of doorway 13.

FIG. 4 illustrates an alternative embodiment wherein two housings, 12a and 12b, are employed, with housing 12a on located on the left side and housing 12b located on the right side of doorway 13. Housing 12a may contain one or more cameras and/or illuminators, and housing 12b may contain one or more cameras and/or illuminators.

FIG. 5 illustrates another alternative embodiment wherein the housing 12 is mounted on a support 17 to the right of the path of the subject 11. Although swept volume 14, 15, 16 is not illustrated in FIG. 5, the same swept volume as illustrated in FIG. 2 applies to the embodiment of FIG. 5. In this embodiment, the doorway 13 is closed, but would be opened or unlatched by the system of the invention if biometric matching identifies the subject 11 as authorized to pass through doorway 13.

FIG. 6 illustrates an embodiment wherein the housing 12 is mounted at a distance 18 above the floor or ground 17, with mount 19 supporting the housing from an overhead structure (not shown). In this embodiment, the housing has no contact with the ground 17.

Figure 7:
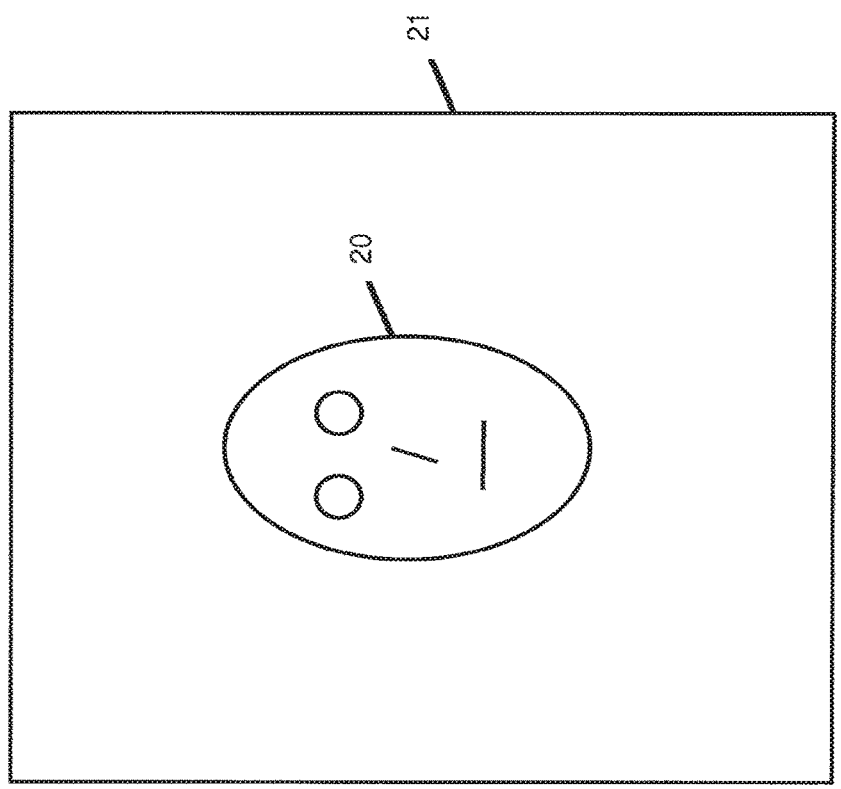
FIG. 7 illustrates Area of biometric acquisition with the subject inside acquisition area FIG. 8 (Comparative) illustrates traditional stroboscopic illumination that illuminates the whole area.

FIG. 7 illustrates a face 20 within an area 21 of biometric acquisition, i.e., the area over which the camera(s) are adapted to view. The camera(s) has/have a field of view 21 at a particular instant wherein the face 20 of the subject must pass for biometric acquisition to occur.

Figure 8:
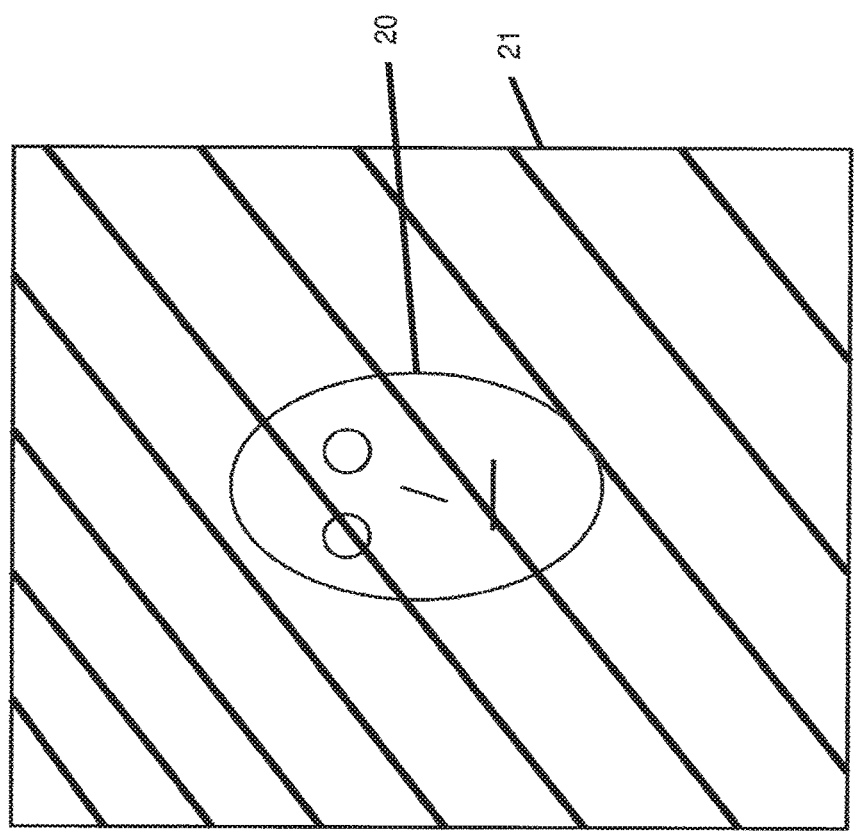

FIG. 8 (comparative) illustrates a prior art embodiment wherein a stroboscopic illuminator illuminates the whole area 21 as disclosed in U.S. Pat. No. 4,762,410, which is much larger, relatively, than the area of the subject's face 20.

Figure 9:
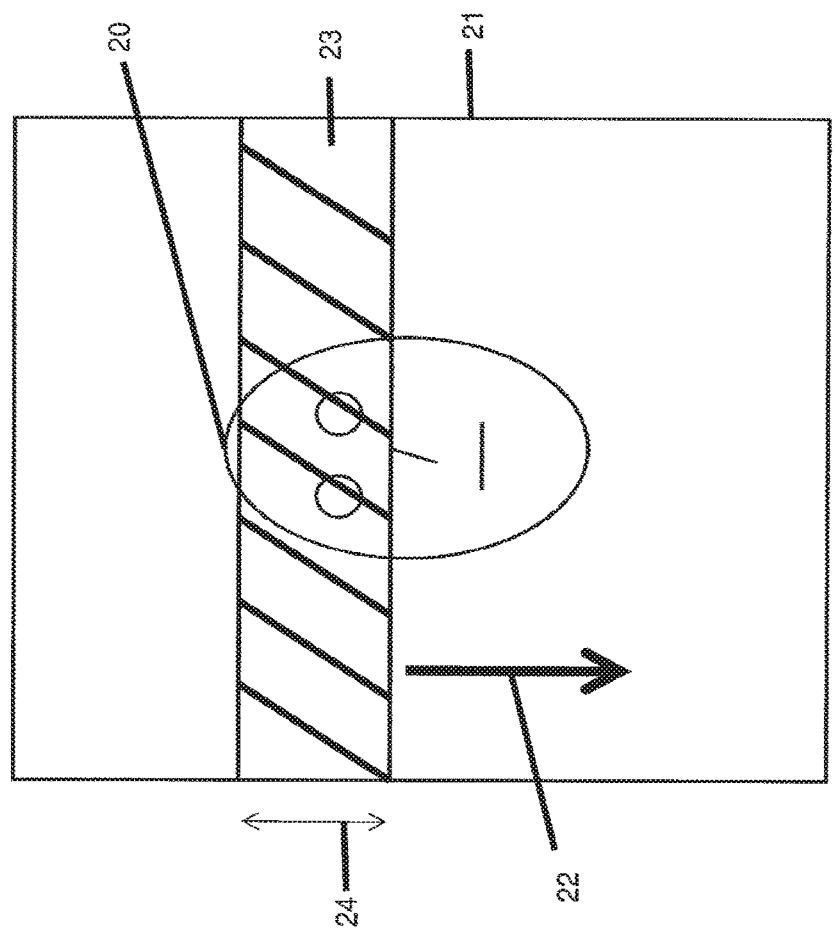
FIG. 9 illustrates non-stroboscopic, constant illumination in a smaller area of dimension that is scanned over whole area in direction D such that light is only on the eye area for a fraction of the time as in stroboscopic illumination, but many fewer illuminators are required, and high-power pulsed operation which is stressful to the LED is not required

FIG. 9 illustrates an embodiment of the invention wherein the illuminator(s) are not strobed but rather are either moved or their illumination is redirected. A preferred method is to move the illumination by one or more mirrors. In this embodiment, substantially rectangular area of illumination 23 having a height 24 is scanned substantially in direction 22 using a moving mirror so that that light is only on the eye area of face 20 for a short time. Fewer illuminators are required, high-power pulsed operation is not required in this embodiment, resulting in less stress to the illuminator components and lower cost components.

Figure 10:
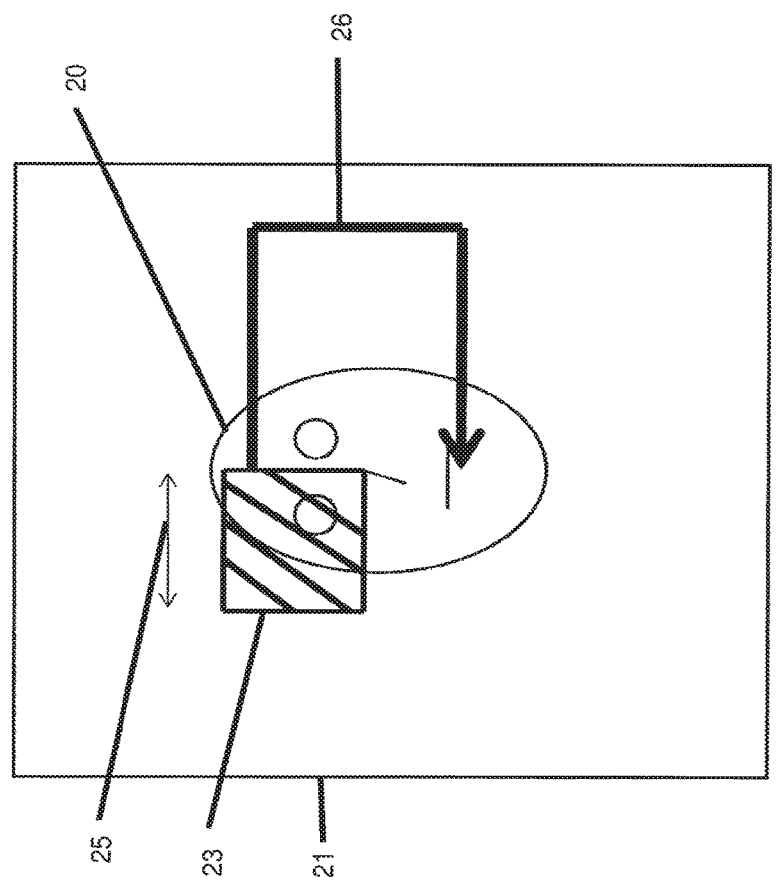
FIG. 10 illustrates a two dimensional scan pattern of constant illumination following a path within an area of biometric acquisition, with subject inside the area of biometric acquisition.

FIG. 10 illustrates an alternative embodiment wherein substantially rectangular area 23 is much smaller than as illustrated in FIG. 9, having a width 25 which is much smaller than in FIG. 9, and wherein the area of illumination 23 is scanned left to right and then right to left in a zigzag pattern 26 so as to cover the entire area 21 starting with one corner and zigzagging across and down, and then repeating the zigzagging. In this embodiment, the area of interest is only illuminated for a fraction of the time of the illumination.

Figure 11:
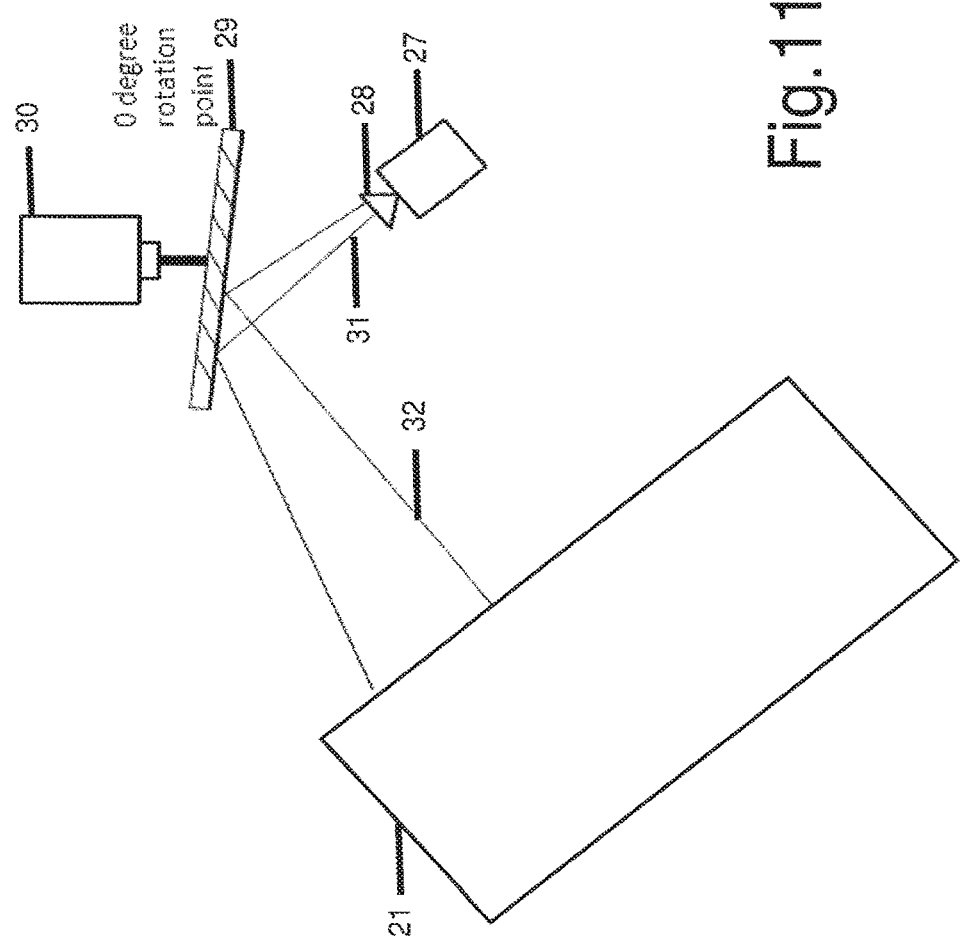
FIG. 11 illustrates a preferred method for creating the scan pattern in FIG. 9, using an illuminator, a tilted mirror which is rotated using an electric motor, showing how at 0 degree rotation light from the illuminator is projected at the top of the area of biometric acquisition.

FIG. 11 illustrates an area of biometric acquisition 21 which is illuminated by illumination 32 which originates from illumination module 27 through lens 28. The illumination 31 originating at lens 28 is directed toward mirror 29 which is rotated by motor 30, causing the illumination 32 to scan according to the pattern illustrated in FIG. 9.

Figure 12:
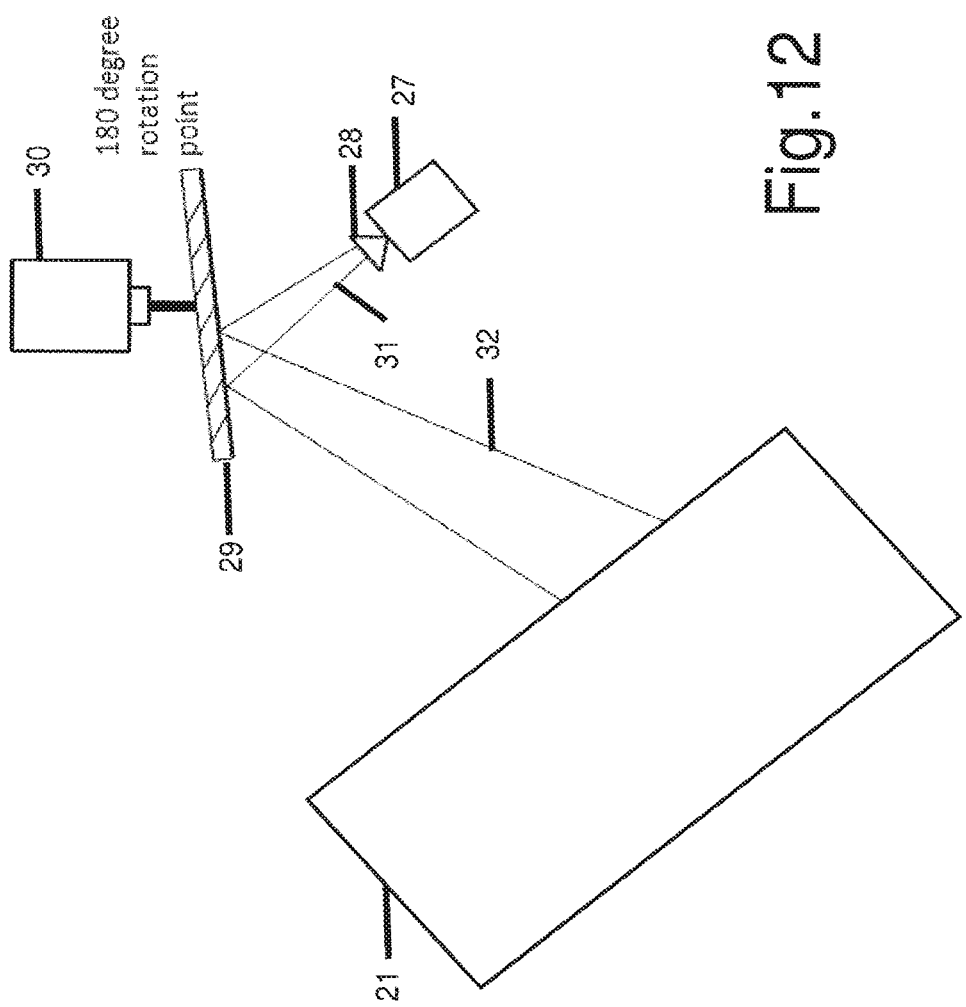
FIG. 12 illustrates shows how at 180 degree rotation, light from the illuminator is projected at the bottom of the area of biometric acquisition.

FIG. 12 illustrates the redirection of illumination 31 coming from mirror 29 when the mirror 29 is at 180 degree rotation and light is projected down area 21.

Figure 13:
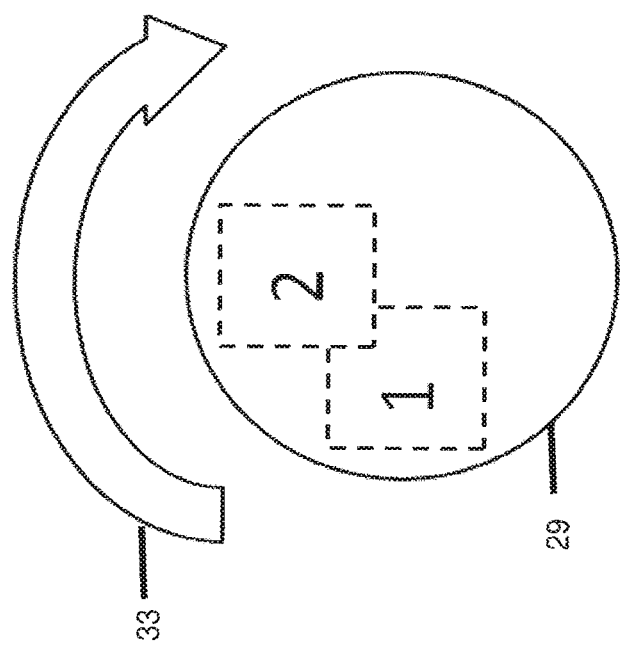
FIG. 13 shows a profile view of the tilted mirror, showing how light projected at position 1 will provide a vertical scan, and light projected at position 2 will provide a horizontal scan.

FIG. 13 illustrates an elevational cross sectional view of mirror 29 and direction of rotation 33, wherein illumination can be directed to either of two areas, 1 or 2, and reflected light would be projected either horizontally or vertically when mirror 29 is rotated.

Figure 14:
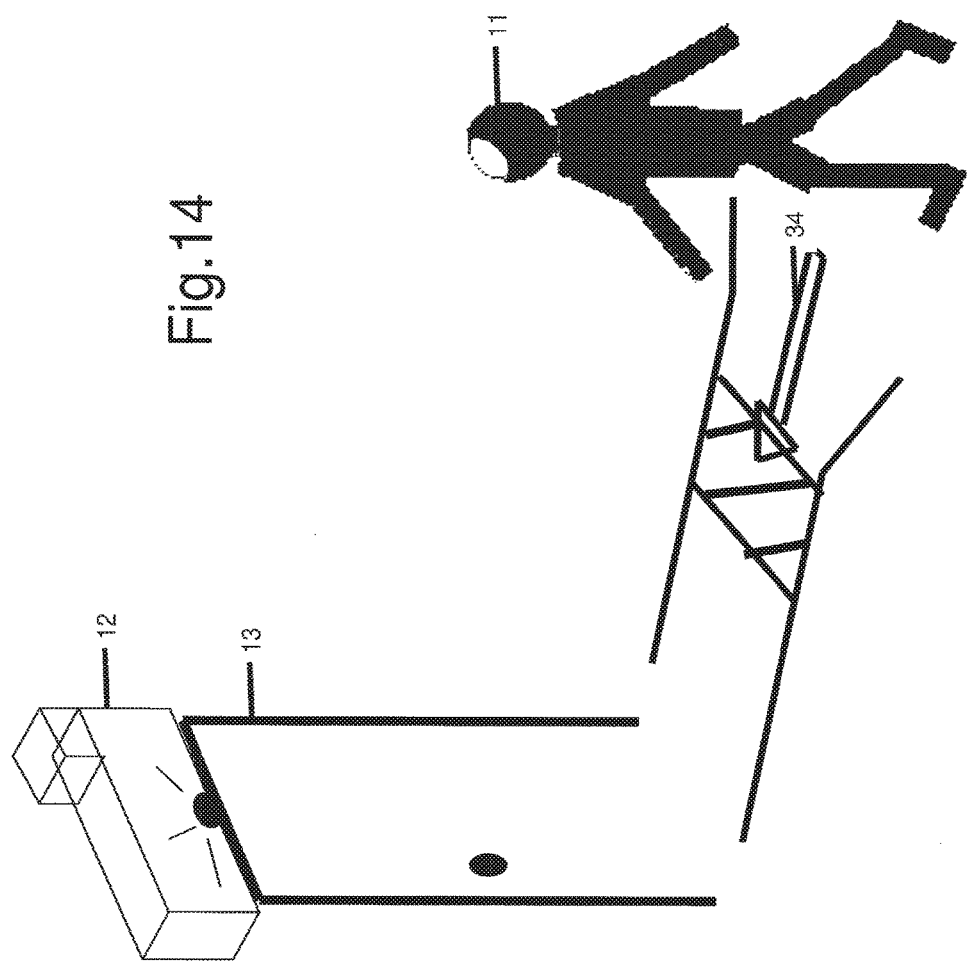
FIG. 14 illustrates a projected guide-path on the ground at time instant 1

FIG. 14 illustrates subject 11 walking toward doorway 13 above which housing 12 is mounted, with arrow 34 projected on the floor.

Figure 15:
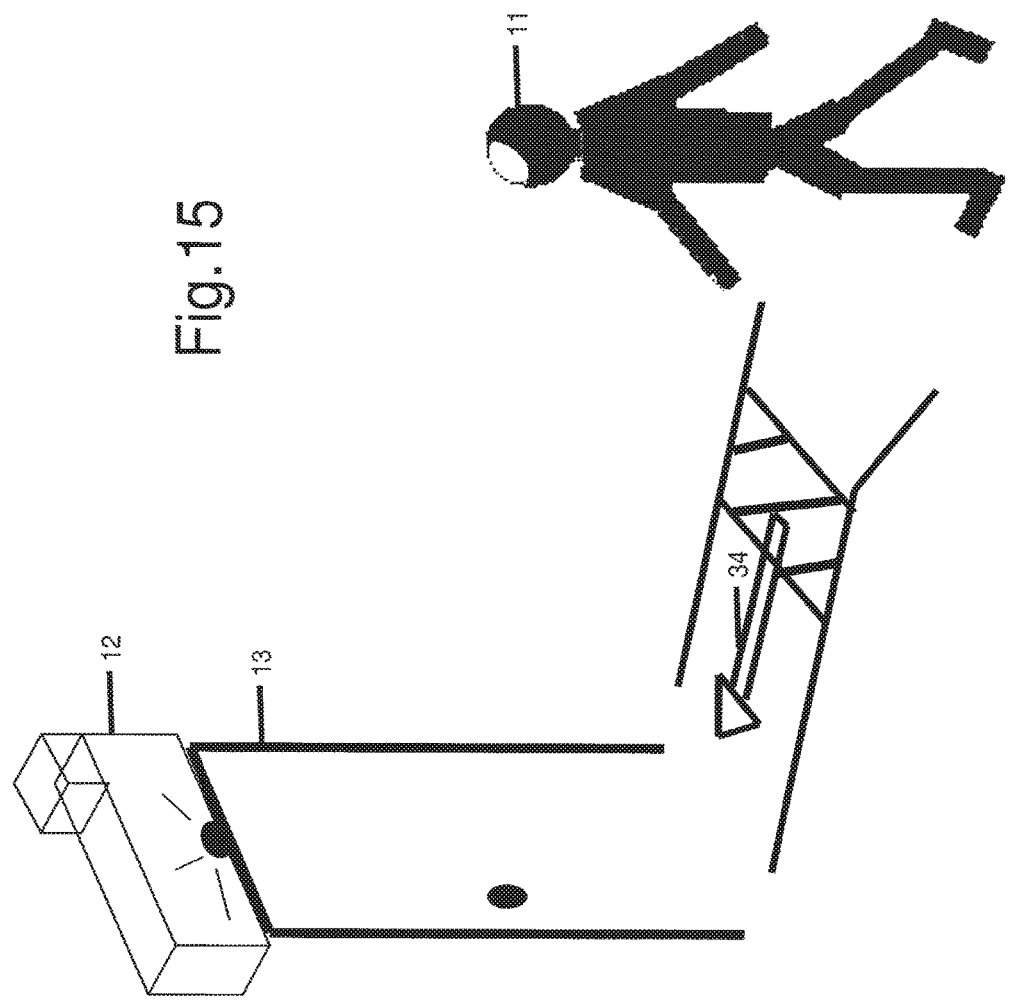
FIG. 15 illustrates a projected guide-path on the ground at time instant 2, such that there is a difference in the projection in order to attract attention to the preferred path and position for the user

FIG. 15 illustrates arrow 34 projected closer to the door at a second instant in time, the projected arrow moving in order to attract attention of subject 11 to the preferred path and position for biometric acquisition.

FIG. 16 illustrates an embodiment which includes a video screen 35 adapted to show video of the person, moving images, and/or text, in order to attract attention as the user walks forward and cause the subject to look toward the housing 12.

Figure 17:
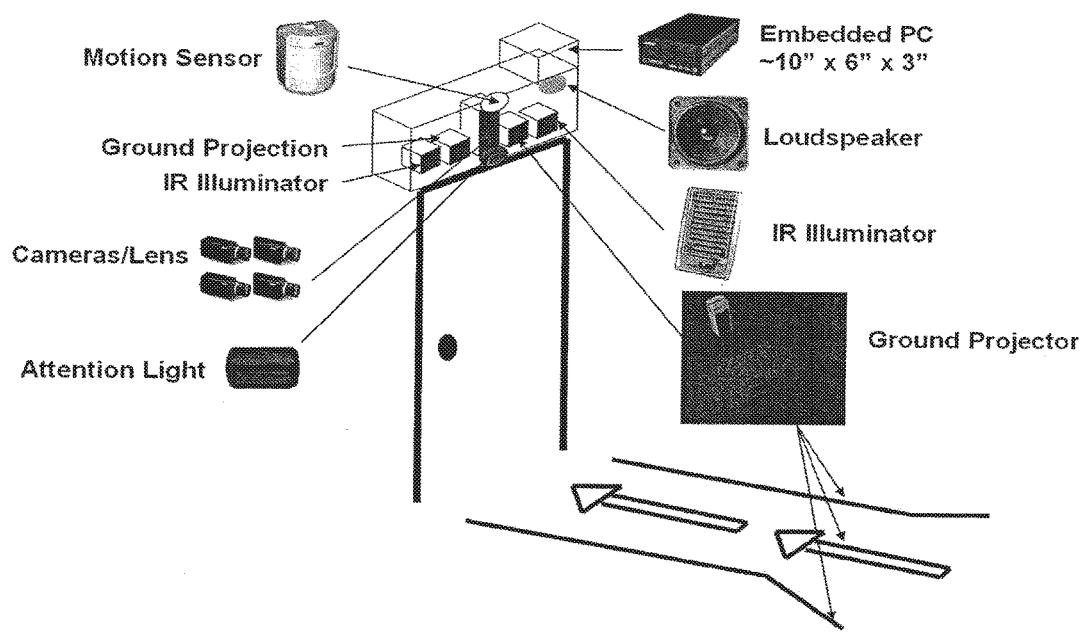
FIG. 17 illustrates a configuration of cameras and illuminators according to the invention.

FIG. 17 shows a particular configuration of lenses, cameras and illuminators that are mounted approximately in the same plane above or in front of the user. For both face and iris recognition, light is transmitted from the illuminators, reflected off the face and/or iris through the camera lens and onto the image plane of one or more cameras. The advantage of having lenses, cameras and illuminators mounted in approximately the same plane is that the device is compact, but the disadvantage is that the specular reflections off glasses can occlude all or portions of the face or eye. U.S. Pat. No. 6,540,392 describes the problem in a micro-illuminator application, where the illuminator is very small. The illuminator can typically be configured to be small only when the user is very close to the device, which is a situation that typically results in the device being uncomfortable to use.

Figure 18:
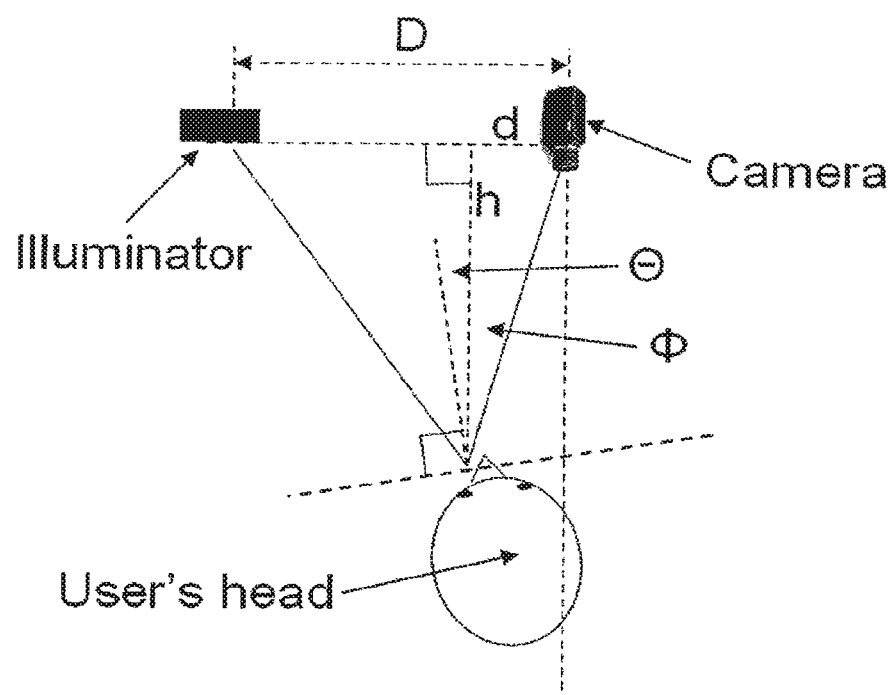
FIG. 18 illustrates an embodiment of the invention where the housing is further from the subject

FIG. 18 shows an example where the illuminators and cameras are significantly further from the user, in order to make the system more comfortable for the user. The figure shows a subject standing in front of a camera at a distance h, head-position offset from the camera by a distance d, head-orientation offset from the camera direction by theta, and with an illuminator at a distance D from the camera as shown. In the case of near-flat glasses, then the geometrical relationship between the parameters defines the configurations where occlusion is expected. More specifically, phi=a Tan(d/h), and Tan(2·theta+phi)=(D−d)/h. If a person is walking while biometric data is being recorded, then the typical amplitude of the variation in head orientation of a person is recorded to be approximately 2 degrees ["Interaction of the body, head and eyes during walking and turning", Imai, Moore, Raphan, Experimental Brain Research (2001), 136: 1-18], and this constrains the optimal configuration. For example, in one configuration, with h=1.2 m, d=0.06 m, then D can be chosen to be at least 0.3 m, so that theta can vary by up to 4 degrees (×2 margin of error) before occlusion will occur. Additional illuminators can be added, for example, on the opposite side of the camera and subjected to the same calculation by symmetry.

Figure 19:
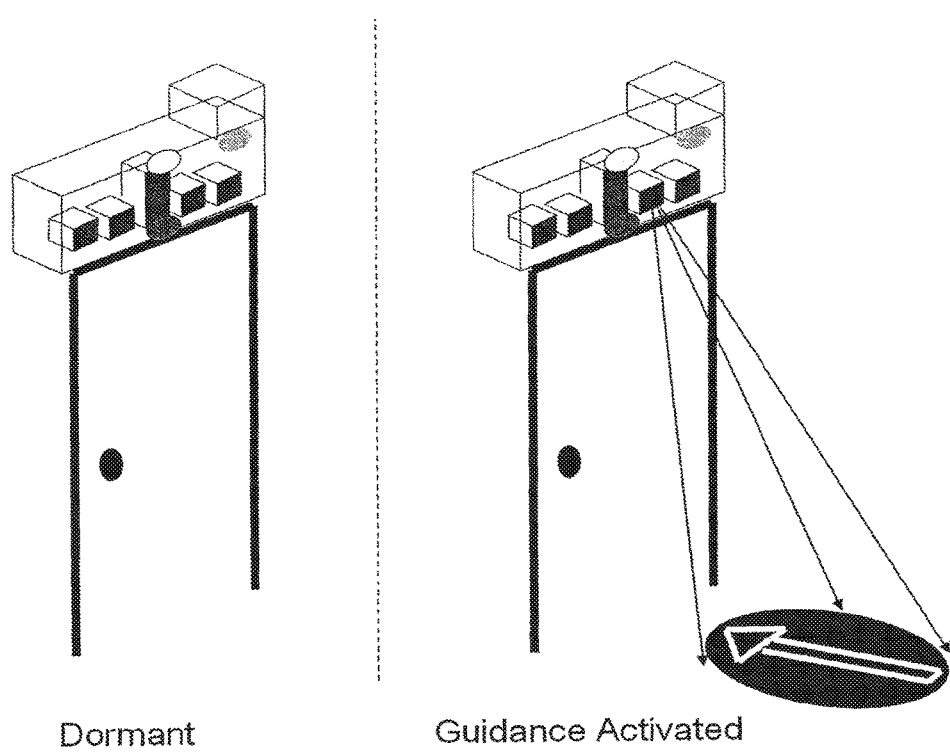
FIG. 19 illustrates a projection of a guide light on the floor.

FIG. 19 illustrates a user-guide light can optionally be projected onto the ground when the presence of the user is detected. This encourages the user to walk through the projected light so that the position of the face or eye of the user is optimal for biometric acquisition with respect to the camera and other components. The presence of the user may be detected using a microwave or infrared motion sensor. The pattern may be projected on the ground using standard illuminators with masked patterns.

Figure 20:
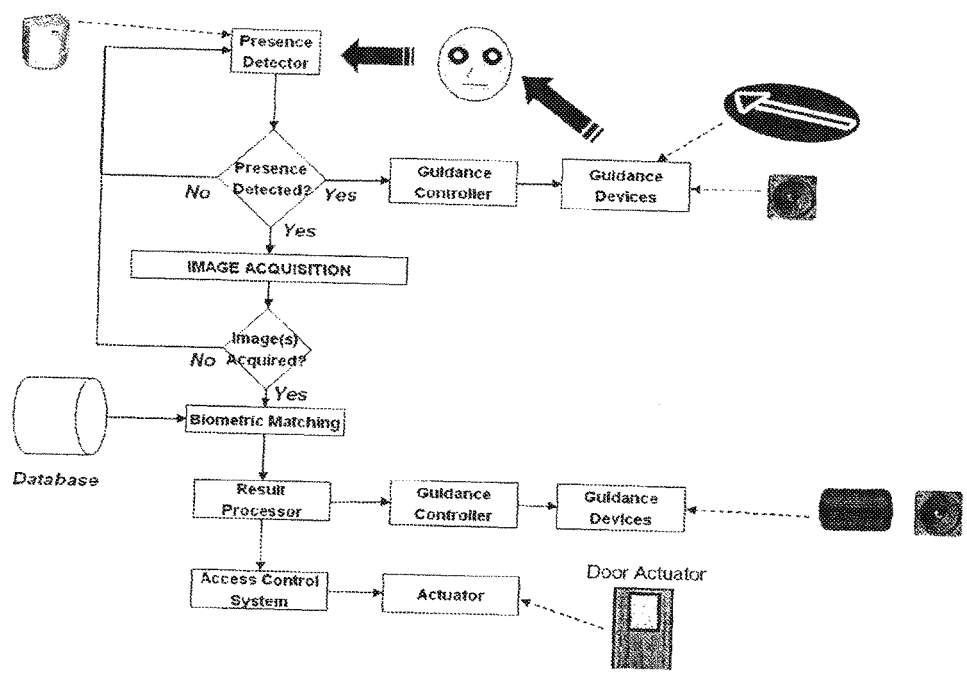
FIG. 20 illustrates a high level system control according to the invention.

FIG. 20 shows the high-level system control. The approaching user is detected by the Presence Detector module. If presence is detected then the guidance controller initiates the projected illumination. Optionally, audio instructions are provided. An image acquisition process is then performed, which includes a step of turning on illumination. A biometric template is extracted from the image and compared to templates stored in the database by the Biometric Matching module. Results of the biometric matching are then passed immediately to the Result Processor module which then sends information to the Guidance Controller to inform the user that they are authorized, unauthorized, or need to repeat the acquisition process. In parallel, the Result Processor optionally sends information to an Access Control System which controls an Actuator to physically disengage a lock, for example.

Presence Detector modules have been used previously but such detectors do not localize the user position well, and do not localize the orientation of users at all. For example, in an airport application, the biometric system may be at a boarding gate in order to verify the identity of boarding passengers, but in fact numerous passengers can be walking orthogonal to the device while in transit to other gates, thereby triggering the infrared or microwave detectors continuously. In another example, a stream of users, each behind each other, may be continuously using the device. This will result in the Presence Detector being continually triggered. Since the Presence Detector triggers the illumination, the illumination will be continually turned on. This greatly increases the degree to which subjects, particularly staff standing continuously by the device, are irradiated. It also reduces the lifetime of the illuminators.

Figure 21:
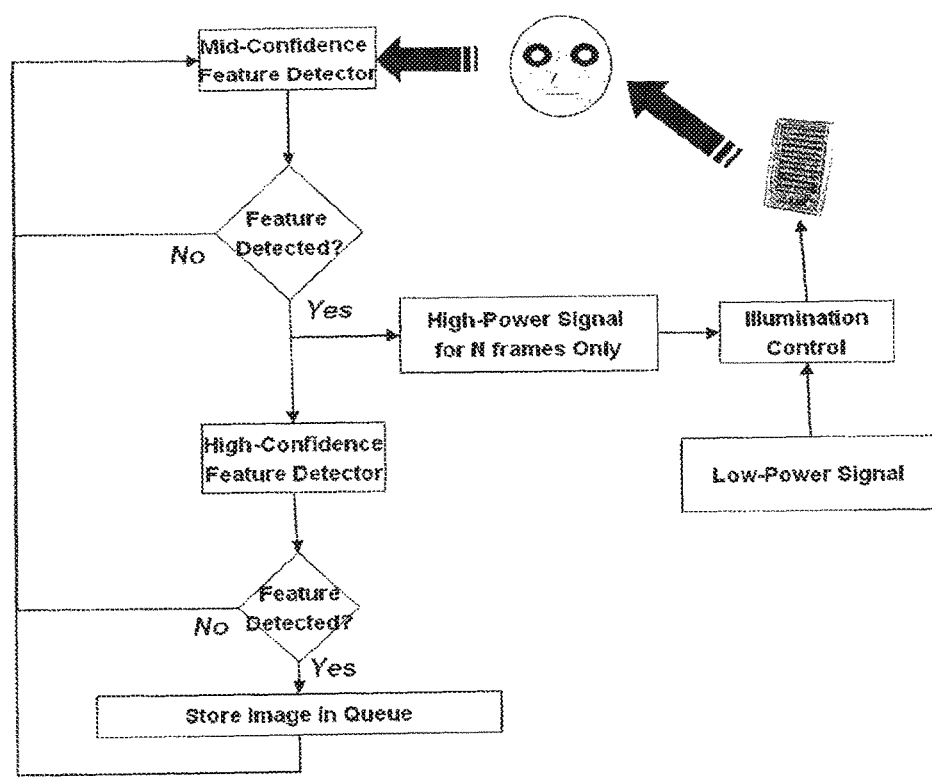
FIG. 21 illustrates illumination at lower levels being used for acquiring biometric data other than iris.

FIG. 21 shows a solution where the illumination is continually on, but at a greatly reduced level. The illumination level is typically not sufficient for reliable biometric matching, but can be sufficient for detection of the potential presence of biometric features (face or eye, for example) in the module called Mid-Confidence Feature Detector. If such a feature is detected, then a control signal is sent to the Illumination Controller to increase the illumination to the desired level only for the number of frames required to acquire the biometric data. For example, only 2-3 frames may be required to ensure that data was acquired reliably. The images acquired under high-power illumination are then processed by a High-Confidence Feature Detector and then stored in a Queue ready for biometric match processing. This approach will only trigger on a person who is facing the system and is ready for biometric acquisition. The approach has the advantage of irradiating the immediate area of the device with the minimum illumination required for biometric acquisition, which increases the lifespan of the illuminators and minimizes the degree to which staff nearby are irradiated.

We also describe fraud-resistance in order to prevent a user from purporting to be another user. For example, photographs of the face or iris can sometimes be used in place of the user's face or iris in order to purport to have another identity. Several methods have been proposed to detect fraud detection. For example, U.S. Pat. No. 6,760,467 describes a method for turning on and off 2 illuminators to detect if a live-eye is in the scene by determining if the specularity from the illuminator is present in the acquired image at the expected time. In another method, it is known that skin and other living tissue has a particular spectral signature that can be differentiated from paper or other synthetic material. This approach either requires multiple sensors to acquire data through spectral filters at the same time, or requires a single sensor to acquire data under different spectral illumination at different times. However, while we wish to acquire single-spectrum data to analyze the spectral signature, we still wish to acquire wide spectrum data that can be reliably used for biometric matching.

Figure 22:
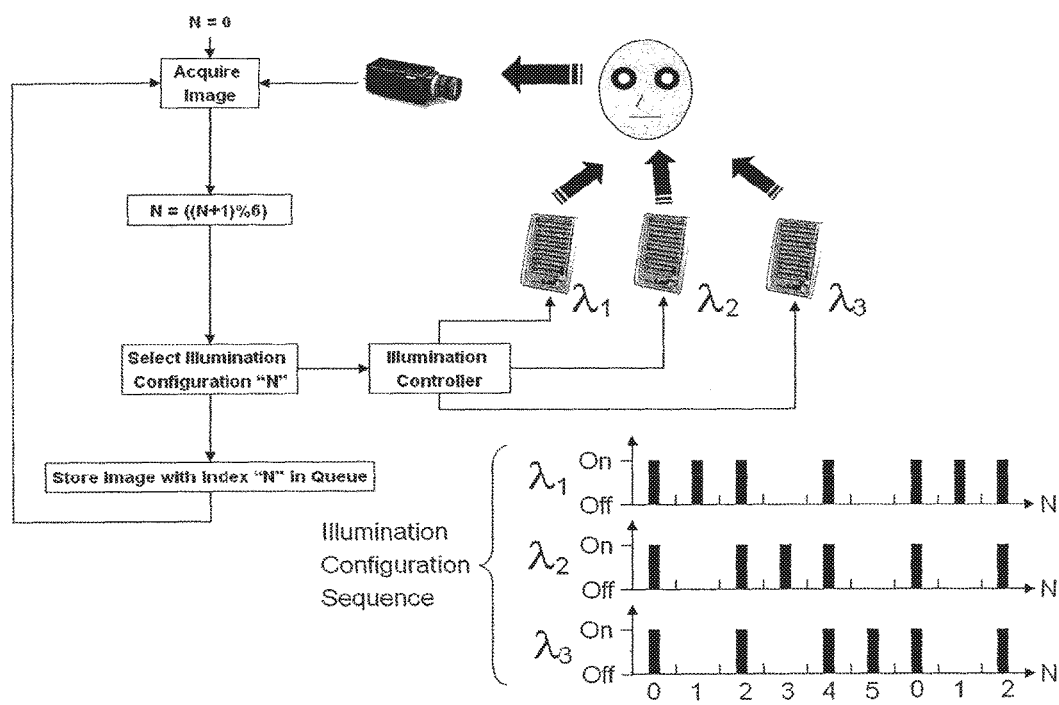
FIG. 22 illustrates an illumination control sequence where wide and single spectrum data is acquired.

FIG. 22 shows an illumination control sequence that optimizes the acquisition of wide spectrum data with single spectrum data. The primary image acquisition loop is on the left. A counter N increments as each frame is acquired and then is reset back to 0 when it reaches a maximum value, which is S in the case presented. The counter N is used to select a previously-stored illumination configuration. The graphs on the right show illumination sequences that optimize the acquisition of wide spectrum data with single spectrum data in the case of 3 illumination frequencies. Full-spectrum illumination is present when each alternate frame is acquired, and these images can be used for biometric matching. Each single spectrum illumination is cycled through one-by-one in the remaining frames. In the case of 3 illumination wavelengths, this means that every 2 frames there is data suitable for biometric matching, while every 6 frames there is data suitable for liveness detection. The quality of the data required for biometric matching is typically higher than that required for liveness detection and therefore the full spectrum data is acquired at the higher acquisition rate. This method can be extended to use a different number of wavelengths. For example, if 4 wavelengths are used, then every 2 frames there is data suitable for biometric matching, while every 8 frames there is data suitable for liveness detection.

We also describe a back-end biometric architecture that allows a biometric device to be integrated to a non-biometric architecture without losing the additional functionality that the biometric device enables, and where either type of device can be managed and deployed in the same way. More specifically, most biometric architectures have been developed to optimize biometric performance with minimal or no consideration of the large base of installed non-biometric devices and architectures, and have assumed that integrators will be specially trained to integrate biometric devices. These are amongst the factors that have limited the widespread deployment of biometric devices. As discussed later, this is especially relevant when a biometric device is used to compare a biometric template acquired from a user with more than one template in the database (recognition) as oppose to comparing a template with just one candidate template in the database (verification).

In the case of verification, a card-swipe of other means of identification sends a small set of data to a processor for one-to-one comparison. In the case of recognition however, the processor needs to be capable of performing one-to-many comparisons rapidly, and the comparisons are typically not simple digit matching—they are biometric template matching, which typically takes substantially more processing. As a result, custom biometric match processors have been developed to perform the biometric matching. However, these custom match processors have biometric databases that are typically managed separately from the standard database that may already exist at a deployment. We propose an architecture where non-biometric devices and biometric devices can co-exist in the same architecture without any loss of functionality, and where either type of device can be managed and deployed in the same way.

Figure 23:
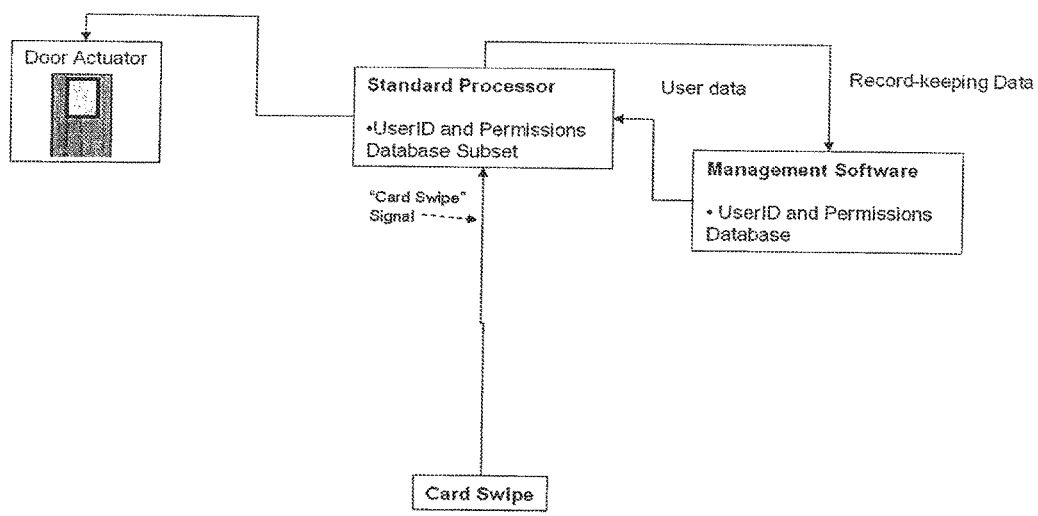
FIG. 23 illustrates standard access control architecture where management software stores user data and a standard processor stores a subset thereof.

FIG. 23 shows a standard access control architecture where Management Software stores all user data with access permissions, and the Standard Processor stores a subset of that data. The one-to-one user identification method (e.g. card swipe) is connected to the Standard Processor and the result of the processing is then user to control entry, for example.

Figure 24:
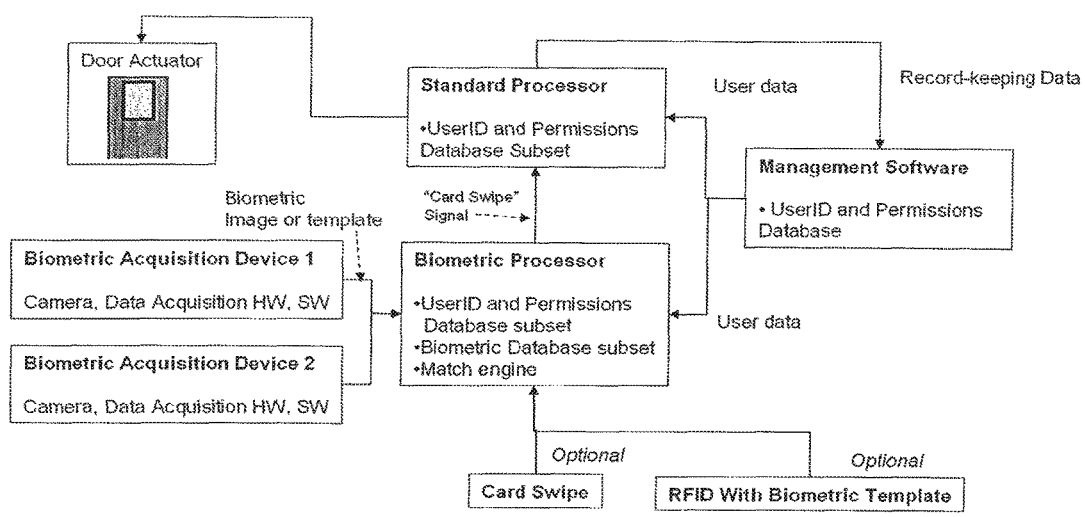
FIG. 24 is the system of FIG. 23 modified to include an additional biometric processor.

FIG. 24 shows the same architecture, but an additional Biometric Processor has been added, together with 1 or more Biometric Acquisition Devices. The Management Software communicates to both the Standard Processor and the Biometric Processor using the same protocols and field formats, except the Biometric Processor is receptive to an additional field which contains the user's biometric information. The Biometric Acquisition Device and the Biometric Processor communicate using specific protocols in order to pass biometric template information. The output of the Biometric Processor uses the same protocols and field formats as a nonbiometric acquisition device, such as a card swipe, even though the data was derived from use of the Biometric Acquisition Device. This data can then be fed directly to the Standard Controller, thereby enabling all the existing Management Software functions to be performed seamlessly even on biometrically-derived data. This approach allows biometric devices capable of recognition to be added seamlessly to systems that comprise nonbiometric devices without any loss of functionality, and where either type of device can be managed and deployed in the same way.

Figure 25:
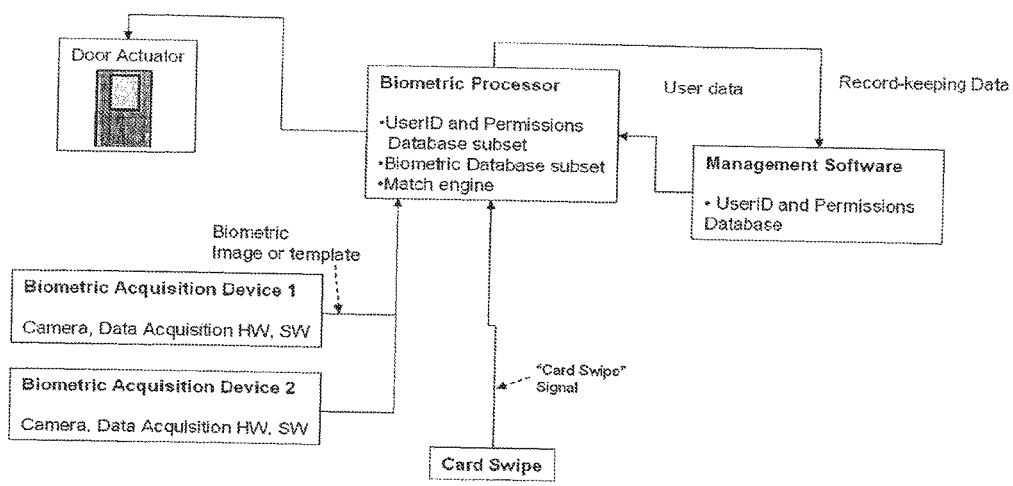
FIG. 25 is the system of FIG. 24 with functions of the standard processor being assumed by the biometric processor.

FIG. 25 shows an additional architecture that shows how the functions of the Standard Processor are assumed by the biometric-enabled Processor.

The preferred distance between the camera or cameras and the subject at the time of acquiring biometric data depends on the particular application. For example, when there is no equipment in the way, the preferred horizontal distance is 0.45 m to 3.15 m where the camera or cameras are mounted above the swept-volume, for example in access-control at doorways, identification at airports, border crossings and hotels. For certain embodiments where one or more cameras are mounted above or to one side of the swept volume, the preferred distance is 0.3 m to 5.72 m such that the angle between the optical axis of the one or more cameras and a vector defining the path of the swept volume is less than approximately 45 degrees, for example for identification through windshields of cars, as well as access-control at doorways, identity validation at airports, border crossings or hotels where mounting of cameras from above is not preferred. For certain embodiments where one or more cameras are mounted to one side of the swept volume, such that the angle between the optical axis of the one or more cameras and a vector defining the path of the swept volume is greater than approximately 45 degrees, a preferred distance is 0.1 m to 2.8 m for example in border control lanes and point-of-sale terminals. A distance of 0.1 to 5.72 m is preferred for certain embodiments for access-control at doorways, identification at airports, border crossings and hotels, identification through windshields of cars, border control lanes, point-of-sale identification, and desk-based or kiosk-based identification, or identification using a substantially mobile device, especially the where illumination is scanned.

In embodiments wherein the housing 12 is placed above a doorway or portal, the biometric data is preferably acquired when the horizontal distance between the subject and at least one of the cameras is between 97.28 and 201.93 cm.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A system for acquisition of biometric data from a subject in a transport or vehicle, the system comprising:
   at least one light source configured to:
      illuminate a subject with light pulses from a first spectrum and a second spectrum of a plurality of discrete light spectra, and
      illuminate the subject with light pulses from the second spectrum, of the plurality of discrete light spectra, the second spectrum different from the first spectrum;
   a sensor configured to
      acquire, at a first rate of acquisition, a set of iris data from the subject for biometric matching, using the light pulses from the first spectrum and the second spectrum, and
      acquire at a second rate of acquisition that is lower than the first rate of acquisition and interleaved with the acquisitions at the first rate of acquisition, a set of biometric data from other than an iris of the subject using the light pulses from the second spectrum; and
   at least one processor configured to perform biometric matching using data from the set of iris data, and liveness detection.

2. The system of claim 1, wherein the sensor is further configured to acquire, at a third rate of acquisition interleaved with the acquisitions of the set of iris data and the set of biometric data, another set of biometric data from the subject, using light pulses from a third spectrum of the plurality of discrete light spectra.

3. The system of claim 1, wherein the sensor is further configured to acquire some of the iris data from the subject while the subject is moving.

4. The system of claim 1, wherein each of the plurality of discrete light spectra comprises light of a single wavelength.

5. The system of claim 1, wherein each of the light pulses from the first spectrum and the second spectrum is formed from a light pulse from the first spectrum and a light pulse from the second spectrum.

6. The system of claim 1, wherein the sensor is configured to acquire the set of iris data with an image quality higher than that of the set of biometric data.

7. The system of claim 1, wherein the set of biometric data comprises data indicative of light reflected from skin of the subject.

8. The system of claim 1, wherein the at least one processor is configured to perform liveness detection using the set of biometric data.

9. The system of claim 1, further comprising at least one processor configured to detect a spectral signature consistent with skin or living tissue using the set of biometric data.

10. The system of claim 1, wherein the sensor is configured to acquire the set of iris data using light from a spectrum wider than the second spectrum.

11. A method for acquisition of biometric data from a subject in a transport or vehicle, the method comprising:
   illuminating a subject with light pulses from a first spectrum and a second spectrum of a plurality of discrete light spectra;
   acquiring, by a sensor at a first rate of acquisition, a set of iris data from the subject for biometric matching, using the light pulses from the first spectrum and the second spectrum;
   illuminating the subject with light pulses from the second spectrum of the plurality of discrete light spectra, the second spectrum different from the first spectrum;
   acquiring, by the sensor at a second rate of acquisition that is lower than the first rate of acquisition and interleaved with the acquisitions at the first rate of acquisition, a set of biometric data from other than an iris of the subject using the light pulses from the second spectrum; and performing biometric matching using data from the set of iris data and liveness detection.

12. The method of claim 11, further comprising acquiring, by the sensor at a third rate of acquisition interleaved with the acquisitions of the set of iris data and the set of biometric data, another set of biometric data from the subject, using light pulses from a third spectrum of the plurality of discrete light spectra.

13. The method of claim 11, further comprising acquiring some of the iris data from the subject while the subject is moving.

14. The method of claim 11, wherein each of the plurality of discrete light spectra comprises light of a single wavelength.

15. The method of claim 11, wherein each of the light pulses from the first spectrum and the second spectrum is formed from a light pulse from the first spectrum and a light pulse from the second spectrum.

16. The method of claim 11, further comprising acquiring the set of iris data with an image quality higher than that of the set of biometric data.

17. The method of claim 11, wherein the set of biometric data comprises data indicative of light reflected from skin of the subject.

18. The method of claim 11, comprising performing liveness detection using the set of biometric data.

19. The method of claim 11, further comprising detecting a spectral signature consistent with skin or living tissue using the set of biometric data.

20. The method of claim 11, wherein acquiring the set of iris data from the subject comprises acquiring the set of iris data using light from a spectrum wider than the second spectrum.

* * * * *